3,701,724
ELECTRODES FOR ELECTROCHEMICAL PROCESSES
John Hubert Entwisle, Denis Lee, and Anthony Scrutton, Runcorn, England, assignors to Imperial Chemical Industries Limited, London, England
No Drawing. Filed Oct. 3, 1969, Ser. No. 863,705
Claims priority, application Great Britain, Oct. 18, 1968, 49,479/68
Int. Cl. B01r 3/04
U.S. Cl. 204—290 F        5 Claims

ABSTRACT OF THE DISCLOSURE

An electrode for use in electrochemical processes comprising a film-forming metal support member and a coating thereon consisting of (a) an operative electrode material, e.g., a platinum group metal oxide, in minor amount and (b) one or more of tin dioxide, antimony pentoxide, antimony tetroxide and germanium dioxide in major amount.

---

The present invention relates to electrodes for electrochemical processes. More particularly it relates to improvements in electrodes comprising a layer of operative electrode material carried on an electro-conducting support material.

Electrodes for use under corrosive electrochemical conditions are known which comprise an electro-conducting support made of a material which is resistant to electrochemical attack under the conditions ruling in the electrochemical cell and an electro-conducting coating, which may be porous, on the support, the coating also being resistant to electrochemical attack and being more reactive than the support material in transferring electrons to or from the ions of an electrolyte. The coating is usually one of the platinum group metals and/or the oxides thereof and the support is usually one of the film-forming metals (sometimes called "valve metals") namely titanium, zirconium, niobium, tantalum or tungsten or alloys consisting principally of these metals.

Although metal electrodes of the aforesaid type are very resistant to electrochemical attack their platinum metal coatings do wear away at an appreciable rate or even break away from the supporting material, especially when they are used as anodes under very corrosive conditions, as for instance in cells electrolysing aqueous solutions of alkali metal chlorides. The present invention provides an improved electrode of the coated film-forming metal type, which has a low wear rate under the most corrosive anodic conditions. In its most preferred form it has other advantages as will appear hereinafter when used as an anode in aqueous alkali metal chloride electrolysis.

According to the present invention we provide an electrode for use in electrochemical processes which comprises a support of a film-forming metal as hereinbefore defined carrying on at least a part of its surface and conductively bonded thereto a coating consisting of a minor amount of an operative electrode material as hereinafter defined and a major amount of a material selected from tin dioxide, antimony pentoxide, antimony tetroxide, the rutile form of germanium dioxide and mixtures of these.

By "an operative electrode material" we mean an electronically-conducting material which is resistant to electrochemical dissolution in the cell and will itself function as an electrode.

The operative electrode material may most suitably consist of one or more of the platinum group metals, i.e. platinum, rhodium, iridium, ruthenium, osmium and palladium, and/or the oxides thereof. Other suitable materials are for instance rhenium, rhenium dioxide, rhenium trioxide, manganese dioxide, titanium nitride and the borides, phosphides and silicides of the platinum group metals.

An electrode according to the invention is particularly useful as an anode in cells electrolysing aqueous alkali metal chloride solution when the film-forming metal support is titanium or an alloy based on titanium and having anodic polarisation properties comparable with those of titanium as known in the art, and the operative electrode material consists substantially of one or more oxides of the platinum group metals. By "consists substantially of" in this context we mean that all or substantially all of the platinum group metals in the electrode coatings are present in the oxidised state, and we therefore include in this term coatings in which a small amount of free platinum group metal is present as well as the oxides. In a preferred form of the electrode the support material is titanium or a titanium alloy as aforesaid and the operative electrode material consists substantially of ruthenium dioxide.

The coating consisting of an operative electrode material and oxides of tin, antimony, germanium or mixtures thereof as aforesaid may be conductively bonded to the surface of a film-forming metal support by mixing the operative electrode material in powder form, e.g. a preformed platinum group metal oxide, with a solution of a thermally-decomposable organo-compound or a thermally-oxidisable inorganic compound, e.g. a halide, of tin, antimony or germanium or a mixture of such compounds in a lower aliphatic alcohol or other suitable organic solvent, e.g. toluene, benzene or carbon tetrachloride, applying the mixture as a coating on a chemically-cleaned surface of the support, drying the coating by heating, e.g. at 100–200° C., to evaporate the solvent and then heating at a higher temperature, suitably in the range 250–800° C. and preferably in air, to convert the original compound in the desired oxide of tin, antimony or germanium. This coating procedure may then be repeated a number of times to build up the desired thickness of finished coating. The time of heating to decompose the organo-compound should be shorter the higher the temperature employed, so as to avoid excessive reaction between the film-forming metal support and the coating or oxygen of the atmosphere. For example at a temperature of 450–500° C. a time of about 15 minutes is suitable and at 800° C. a suitable time is about 15 seconds. The coated support may be placed in a furnace in air at the desired temperature and maintained there for the requisite time. Alternatively, the coated support may be heated slowly to the desired temperature and then maintained there for sufficient time to complete substantially the conversion of the metal compounds in the coating to oxides, e.g. after drying the coating at 100–200° C. the coated support may be placed in a furnace in air at about 200° C., heated to about 450° C. in the furnace over a period of 10–15 minutes and then held at this temperature for a further 15 minutes.

In an alternative method of producing an electrode according to the invention the cleaned film-forming metal support is first coated with the operative electrode material and the oxide of tin, antimony germanium or mixtures thereof, as the case may be, is afterwards added to the coating by applying thereto a solution of a thermally-decomposable organo-compound or a thermally-oxidisable inorganic compound of the chosen elements in an organic solvent and then drying and heating as discussed in the preceding paragraph to convert the compounds to the oxides and cause the oxides to penetrate through the layer of operative electrode material and to knit to the underlying film-forming metal support. For example a film-forming metal support, e.g. a titanium support, may first be coated with a platinum group metal in known manner, for instance by painting the cleaned titanium surface with a solution of a platinum group metal compound in an organic solvent and containing a reducing agent, e.g. linalool, drying the coating then heating the coating at a temperature of approximately 300° C. to produce a deposit of the platinum group metal, oxidising the platinum group metal deposit if desired, e.g. by heating in an oxidising atmosphere at a temperature of at least about 350° C., repeating this coating operation as necessary to build up the desired thickness of the platinum group metal or oxide, and then applying an organo-tin compound, drying and heating as aforesaid.

In a preferred method of producing an electrode according to the invention the separate coating steps of the example in the preceding paragraph are combined. For example, a chemically cleaned film-forming metal support, e.g. a titanium support, may be coated with a solution containing a platinum group metal compound and an organo-tin compound. The coating is then allowed to dry in air or is dried in an oven, e.g. at 100–200° C., and is then heated in an oxidising atmosphere at a temperature sufficiently high to complete substantially the decomposition of the organo-tin compound to tin oxide and if desired sufficiently high to convert the platinum group metal in the coating to oxide. The oxidising atmosphere may be air or air enriched with oxygen and optionally under superatmospheric pressure according to the oxidising potential desired. Suitable methods, times and temperatures of heating are as discussed in the penultimate paragraph in respect of coatings containing operative electrode material in powder form.

The thermally decomposable compounds of tin, etc. used for making the coatings may suitably be metal alkoxides, alkoxy-metal halides or alkyl metal halides. These may be partially hydrolysed by adding a small amount of water to a solution of the compounds before use if desired to assist the formation of the metal oxides in the final heating step.

Whichever method of application is employed, the first layer of coating composition is in general applied directly to a chemically-cleaned surface of the film-forming metal support. The support is degreased if necessary and then pickled, for instance in hot oxalic acid solution or in hot or cold hydrochloric acid. Within the scope of the invention, however, the first coating may be applied to a film-forming metal support which has been given an oxidising treatment to produce a very thin surface layer of the film-forming metal oxide after the aforesaid cleaning treatment, as is known in the art for applying other coating compositions to film-forming metal supports.

When the electrode surface is built up by superimposing a plurality of coatings containing compounds of tin, antimony, germanium or mixtures thereof as aforesaid, the heating step in an oxidising atmosphere, e.g. at 250–800° C., to convert the said compounds substantially to oxides may be carried out after applying and drying each coating. Alternatively this heating step may be carried out each time after applying and drying a fraction of the total number of coatings greater than one coating, for instance after each second or third coating.

As afersaid, the coatings of the electrode according to the invention contain a minor amount of an operative electrode material and a major amount of oxides of tin, antimony or germanium or mixtures of these. As will be seen from the appended examples, when the operative electrode material consists substantially of an oxide of a platinum group metal the overpotential at the electrode when this is used as an anode in brine electrolysis is lowest when the amount of the platinum group metal oxide in the coating is 20% or more by weight. The preferred proportions of platinum group metal oxide are 20–48% by weight. Nevertheless, as will also be seen from the examples, proportions lower than 5% by weight also provide useful electrodes. In general coatings in which the operative electrode material consists substantially of one or more platinum group metal oxides should contain at least 0.5% by weight of these oxides.

Electrodes according to the invention are useful in electrolytic cells, electrodialysis cells, in cathodic protection systems and for electrocatalysis, e.g. in fuel cells and electrosynthesis of organic compounds.

The following examples further illustrate the manufacture of electrodes according to the invention. All parts are by weight.

EXAMPLE 1

A solution of an olkoxy-tin compound was prepared by heating a mixture of 6 parts of stannic chloride with 44 parts of isopropyl alcohol at 70° C. for one hour. 25 parts of the resultant solution, cooled to room temperature, were mixed with a slution of 1.8 parts of ruthenium trichloride in 25 parts of isopropyl alcohol. This coating composition was painted on to a strip of titanium which had been immersed overnight in hot oxalic acid solution to etch the surface, washed and dried. The coating of paint was dried in an oven at 150° C. and then two further coats of the same composition were applied and dried in the same manner, after which the coated strip was heated in a furnace in air at 450° C. for 15 minutes to complete the conversion of the organo-tin compound substantially to tin oxide and to oxidise the ruthenium trichloride substantially to ruthenium oxide. The whole coating operation and final heating in air at 450° C. was then repeated four times to increase the thickness of the coating. The total weight of finished coating was 8.3 g./m.$^2$. The theoretical composition of the coating was $RuO_2$ 40%/$SnO_2$ 60% by weight but was found by analysis to be $RuO_2$ 48%/$SnO_2$ 52% by weight.

The coated titanium was tested as an anode in sodium chloride brine containing 220 g. NaCl per litre in an electrolysis cell with mercury cathode. In this application the electrode showed a particular advantage in operating at a relatively low chlorine overpotential (20 mv. at a current density of 8 ka./m.$^2$ of the coated surface), which did not rise rapidly with time. Another titanium strip coated in the same manner was operated as an anode in sodium chloride brine containing 220 g. NaCl per litre at 65° C. for 125 days at 8 ka./m.$^2$. During this period the ruthenium oxide loss rate was found to be 0.0075 g./ton of chlorine produced.

EXAMPLE 2

A solution of 2.49 parts of dibutyl tin dichloride $(C_4H_9)_2$—$SnCl_2$ in 4 parts of n-pentanol was mixed with a solution of one part of ruthenium trichloride in 4 parts of n-pentanol. This coating composition was painted on to a strip of titanium which had been etched, washed and dried as in Example 1. The coating of paint was dried in an oven at 180° C. and then two further coats of the same composition were applied and dried in the same manner, after which the coated strip was heated in a furnace in air at 450° C. for 15 minutes to complete the conversion of the organotin compound substantially to tin oxide and to oxidise the ruthenium trichloride substantially to ruthenium oxide. The whole coating operation and final heating in air at 450° C. was then repeated to increase the thickness of the coating. The total weight of the finished coating was 5.3 g./m.$^2$. The composition of the coating was found by analysis to be $RuO_2$ 35%/$SnO_2$ by weight. The coated titanium strip was tested as an anode in sodium chloride brine as in Example 1. The chlorine overpotential at 8 ka./m.$^2$ was found to be 20 mv., which did not rise rapidly with time.

EXAMPLE 3

A solution of 2 parts of tin tetraethoxide in 5.5 parts of n-pentanol was mixed with a solution of one part of ruthenium trichloride in 4 parts of n-pentanol. This coating composition was painted on to a strip of titanium which had been etched, washed and dried as in Example 1. The coating of paint was dried in an oven at 180° C. after which the coated strip was heated in a furnace in air at 450° C. for 15 minutes to complete the conversion of the tin tetraethoxide substantially to tin dioxide and to oxidise the ruthenium trichloride substantially to ruthenium oxide. The whole coating operation and heating in air at 450° C. was then repeated twice to increase the thickness of the coating. The total weight of the finished coating was 8.9 g./m.² The composition of the coating was found by analysis to be $RuO_2$ 20%/$SnO_2$ 80% by weight. The coated titanium was tested as an anode in sodium chloride brine as in Example 1. The chlorine overpotential at 8 ka./m.² was found to be 24 mv., which did not rise rapidly with time.

EXAMPLE 4

A solution of 2.8 parts of stannous 2-ethylhexanoate in 5 parts of n-pentanol was mixed with a solution of one part of ruthenium trichloride in 4 parts of n-pentanol. This coating composition was used to produce a coating consisting substantially of tin oxide and ruthenium oxide on a strip of titanium by the procedure described in Example 2, i.e. using 6 coats in all and heating at 450° C. after each third coat. The total weight of the finished coating was 9.9 g./m.² The composition of the coating was found by analysis to be $RuO_2$ 40%/$SnO_2$ 60% by weight. The coated titanium was tested as an anode in sodium chloride brine as in Example 1. The chlorine overpotential at 8 ka./m.² was found to be 17 mv., which did not rise rapidly with time.

EXAMPLE 5

A strip of titanium was immersed overnight in hot oxalic acid solution to etch the surface of the metal, and was washed and dried. A mixture of ruthenium trichloride one part, isopropyl alcohol 4 parts and linalool 1.3 parts was painted on to the titanium, the coating of paint was allowed to dry in air for 10 minutes and was then heated in a furnace in air at 300° C. for 10 minutes to form a coating consisting substantially of ruthenium. Two further coats of the paint were applied, dried and heated in the same manner. The ruthenium-coated titanium was then heated in air at 450° C. for one hour to oxidise at least the outermost part of the ruthenium layer.

A solution of an alkoxy-tin compound was prepared as in Example 1. This composition was painted on to the above ruthenium-coated titanium strip and dried in an oven at 180° C.; then two further coats of the same composition were applied and dried in the same manner. The coated strip was then heated in a furnace in air at 450° C. for 15 minutes to complete the conversion of the organo-tin compound substantially to tin oxide. The whole of this coating operation and final heating in air at 450° C. was then repeated twice to increase the amount of tin oxide in the coating. The total weight of the finished coating was 14.3 g./m.² and the composition of the coating was found by analysis to be $RuO_2$ 37%/$SnO_2$ 63% by weight. The coated titanium strip was tested as an anode in sodium chloride brine as in Example 1. The chlorine overpotential was found to be 50 mv. at 8 ka./m.²

EXAMPLE 6

A solution of germanium dichloroalkoxide

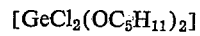
$[GeCl_2(OC_5H_{11})_2]$ was prepared by refluxing 10 parts of germanium tetrachloride with 25 parts of n-pentanol for 22 hours. 5 parts of this solution were mixed with 1.43 parts of a solution made by dissolving 6 parts of ruthenium trichloride in 24 parts of n-pentanol. This coating composition was painted on to a strip of titanium which had been etched, washed and dried as in Example 1. The coating of paint was dried in an oven at 180° C. and then two further coats of the same composition were applied and dried in the same manner, after which the coated strip was heated in a furnace in air at 450° C. for 15 minutes to complete the conversion of the organo-germanium compound substantially to germanium dioxide and to oxidise the ruthenium trichloride substantially to ruthenium oxide. The whole coating operation and final heating in air at 450° C. was then repeated three times to increase the thickness of the coating. The total weight of the finished coating was 14.3 g./m.² and the theoretical composition of the coating was $RuO_2$ 20%/$GeO_2$ 80% by weight.

The coated titanium strip was tested as an anode in sodium chloride brine as in Example 1. The chlorine overpotential was found to be 56 mv. at 8 ka./m.², which did not rise rapidly with time.

EXAMPLE 7

5.4 parts of a solution made by dissolving 2.6 parts of antimony trichloride and 3.4 parts of antimony pentachloride in 44 parts of isopropyl alcohol were mixed with a solution of 0.39 part of ruthenium trichloride in 5.4 parts of isopropyl alcohol. This coating composition was painted on to a strip of titanium which had been immersed overnight in hot oxalic acid solution to etch the surface, washed and dried. The coating of paint was dried in an oven at 150° C. and then two further coats of the same composition were applied and dried in the same manner, after which the coated strip was heated in a furnace in air at 450° C. for 15 minutes to complete the conversion of the antimony chlorides substantially to antimony tetroxide $[Sb_2O_4]$ and to oxidise the ruthenium trichloride substantially to ruthenium oxide. The whole coating operation and final heating in air at 450° C. was repeated four times to increase the thickness of the coating. The total weight of the finished coating was 11.4 g./m.² The theoretical composition of the finished coating was $RuO_2$ 40%/$Sb_2O_4$ 60% by weight.

The coated titanium strip was tested as an anode in sodium chloride brine as in Example 1. The chlorine overpotential at 8 ka./m.² was found to be 20 mv., which did not rise rapidly with time.

EXAMPLE 8

A coating consisting substantially of tin oxide and ruthenium oxide was applied to a strip of titanium by the same procedure and using the same coating composition as described in Example 1 with the exception that, whereas in Example 1 the coated strip was heated after each third coat by placing it in a furnace at 450° C. for 15 minutes, in this modification after each third coat the coated strip was heated slowly from 200° C. to 450° C. at a rate of 20° C. per minute in a furnace in air and was then maintained at 450° C. in a furnace for 15 minutes. When the finished specimen was tested as an anode as in Example 1 the initial overpotential at 8 ka./m.² was again 20 mv.

EXAMPLE 9

A solution of an alkoxy-tin compound was prepared by heating a mixture of 6 parts of stannic chloride with 44 parts of isopropyl alcohol at 70° C. for one hour. To this solution was added 2 parts of antimony trichloride. 26 parts of the resultant solution were mixed with a solution of 2 parts of ruthenium trichloride in 25 parts of isopropyl alcohol. This coating composition was painted on to a strip of titanium which had been etched, washed and dried as in Example 1. The coating of paint was dried in an oven at 150° C. and then two further coats of the same composition were applied and dried in the same manner, after which the coated strip was heated in a furnace in air at 450° C. for 15 minutes to complete the conversion of the tin and antimony compounds substantially to oxides and to oxidise the ruthenium metal in the coating substantially to ruthenium oxide. The whole coating operation and final heating in air at 450° C. was then repeated four times to increase the thickness of the coating. The total weight of the finished coating was 8.0 g./m.² and the theoretical composition of the coating was $RuO_2$ 30%, antimony oxide calculated as the mixed oxide $Sb_2O_4$ 20%, $SnO_2$ 50% by weight.

The coated titanium when tested as an anode in sodium chloride brine as in Example 1 had a chlorine overpotential of 30 mv. at 8 ka./m.$^2$.

EXAMPLE 10

A solution of an alkoxy-tin compound was prepared by heating a mixture of 15 parts of stannic chloride with 55 parts of n-amyl alcohol with reflux for 24 hours. The solution was cooled to room temperature and 0.6 part of water was added. 14 parts of the resultant solution were then mixed with 0.28 part of antimony trichloride and 0.08 part of ruthenium trichloride.

Twelve coats of the composition thus prepared were painted on to a strip of titanium which had been etched, washed and dried as in Example 1. Each coat was dried in an oven at 200° C. before the next coat was applied and after every third coat the coated structure was heated in air at 450° C. for 15 minutes. The total weight of the finished coating was 14 g./m.$^2$ of the coated titanium surface. The theoretical composition of the finished coating was $SnO_2$ 87.6%, antimony oxide calculated as the mixed oxide $Sb_2O_4$ 9.8%, $RuO_2$ 2.6%.

The coated titanium was operated successfully as an anode in chlorinated brine containing 21.5% NaCl at pH 2–3 and a temperature of 65° C. with a current density of 8 ka./m.$^2$ of the coated surface. Under these conditions it showed an initial overpotential of 121 mv.

EXAMPLE 11

A solution of an alkoxy-tin compound was prepared as in Example 10 and 0.6 part of water was again added after cooling the solution to room temperature. 14 parts of the resultant solution were then mixed with 0.28 part of antimony trichloride and 0.21 part of hexachloroplatinic acid hydrate (containing 40% Pt). Twelve coats of the composition thus prepared were painted on to a strip of titanium that had been etched, washed and dried as in Example 1, the coats being dried and then heated in air at 450° C. in the same sequence and the same manner as in Example 10. The total weight of the finished coating was 7.3 g./m.$^2$ of the coated titanium surface. The theoretical composition of the finished coating (assuming complete conversion to oxides) was $SnO_2$ 85.4%, antimony oxide calculated as the mixed oxide $Sb_2O_4$ 9.5%, platinum oxide calculated as $PtO_2$ 4.9%.

The coated titanium was operated successfully as an anode in chlorinated brine under the same conditions as the test in Example 10. Under these conditions it showed an initial overpotential of 136 mv.

EXAMPLE 12

A solution of an alkoxy-tin compound was prepared as in Example 10 and 0.6 part of water was again after cooling the solution to room temperature. 14 parts of the resultant solution were then mixed with 0.28 part of antimony trichloride and 0.1 part of iridium tetrachloride. Twelve coats of the composition thus prepared were painted on to a strip of titanium that had been etched, washed and dried as in Example 1, the coats being dried and then heated in air at 450° C. in the same sequence and the same manner as in Example 10. The total weight of the finished coating was 10 g./m$^2$ of the coated titanium surface. The theoretical composition of the finished coating (assuming complete conversion to oxides) was $SnO_2$ 87.1%, antimony oxide calculated as the mixed oxide $Sb_2O_4$ 9.5%, iridium oxide calculated as $IrO_2$ 3.3%.

The coated titanium was operated successfully as an anode in chlorinated brine under the same conditions as the test in Example 10. Under these conditions it showed an initial overpotential of 250 mv.

EXAMPLE 13

Two coats of a solution of 0.27 part of ruthenium trichloride and 0.3 part of linalool in 5 parts of n-amyl alcohol were painted on to a strip of titanium which had been immersed overnight in hot oxalic acid solution to etch the surface, then washed and dried. Each coat was allowed to dry in air and was then heated in air in an oven at 300° C. for 15 minutes to form a coating consisting substantially of ruthenium metal. The weight of the finished coating was 0.64 g./m.$^2$ of the coated titanium surface.

A solution of an alkoxy-tin compound was prepared by heating a mixture of 15 parts of stannic chloride with 55 parts of n-amyl alcohol with reflux for 24 hours. The solution was cooled to room temperature and 0.6 part of water was added. 14 parts of the resultant solution were then mixed with 0.28 part of antimony trichloride.

Twenty-four coats of the composition thus prepared were painted on to the titanium strip previously coated with ruthenium. Each coat was dried in an oven at 200° C. before the next coat was applied and after every third coat the coated structure was heated in air in a furnace at 400–450° C. for 15 minutes. On completion of these coating and heating operations the coated structure was further heated in air in a furnace at 600° C. for half an hour. The total weight of the finished coating was 26.4 g./m.$^2$ of the coated titanium surface. The theoretical composition of the finished coating (assuming homogeneity and complete conversion to oxides) was $SnO_2$ 87.0%, antimony oxides calculated as the mixed oxide $Sb_2O_4$ 9.7%, $RuO_2$ 3.3%.

The coated titanium was successfully operated as an anode in chlorinated brine under the same conditions as the test in Example 10. Under these conditions the initial overpotential was 250 mv.

What we claim is:

1. In an electrode for use in corrosive electrochemical processes which comprises a film-forming metal support carrying on at least a part of its surface and conductively bonded thereto a coating containing at least one of an operative electrode material, the improvement comprising the said coating consisting essentially of a minor amount of an operative electrode material consisting substantially of at least one oxide of a platinum group metal and a major amount of a material selected from tin dioxide, antimony pentoxide, antimony tetroxide, the rutile form of germanium dioxide and mixtures thereof.

2. An electrode according to claim 1, wherein the platinum group metal oxides are present in amount of at least 0.5% by weight of the coating.

3. An electrode according to claim 2, wherein the proportion of platinum group metal oxides is in the range 20%–48% by weight of the coating.

4. An electrode according to claim 1, wherein the support metal consists essentially of titanium or a titanium alloy having anodic polarization properties comparable with those of titanium.

5. An electrode according to claim 4, wherein the operative electrode material consists substantially of ruthenium dioxide.

References Cited

UNITED STATES PATENTS

| | | | |
|---|---|---|---|
| 3,483,111 | 12/1969 | Zaromb | 204—284 X |
| 3,562,008 | 2/1971 | Martinsons | 204—290 F |
| 3,428,544 | 2/1969 | Bianchi et al. | 204—290 F |
| 3,402,072 | 9/1968 | Dreyfus | 117—201 |
| 3,532,564 | 10/1970 | Glittler | 117—201 X |
| 3,542,572 | 11/1970 | Dalton et al. | 117—201 X |

FOREIGN PATENTS

| | | | |
|---|---|---|---|
| 1,147,442 | 4/1969 | Great Britain | 204—290 F |

OTHER REFERENCES

Chem. Abs., vol. 61: 1017 b–e.

JOHN H. MACK, Primary Examiner

R. J. FAY, Assistant Examiner

U.S. Cl. X.R.

117—230; 204—98